May 23, 1933.  L. J. McKONE  1,910,902
PISTON LUBRICATING STRUCTURE
Filed Nov. 15, 1928  2 Sheets-Sheet 1
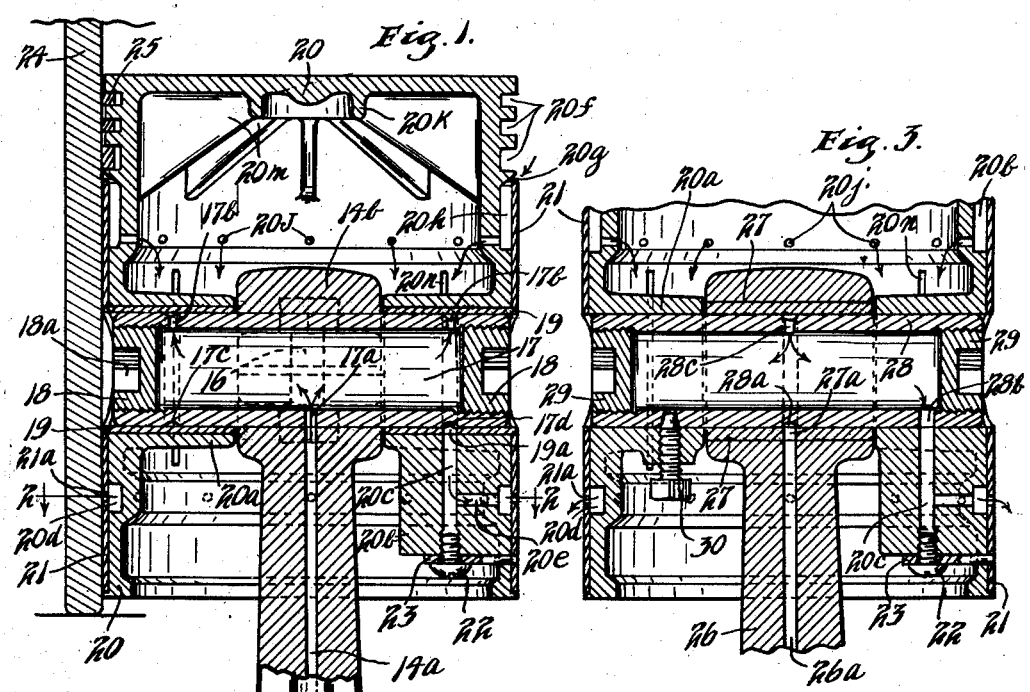
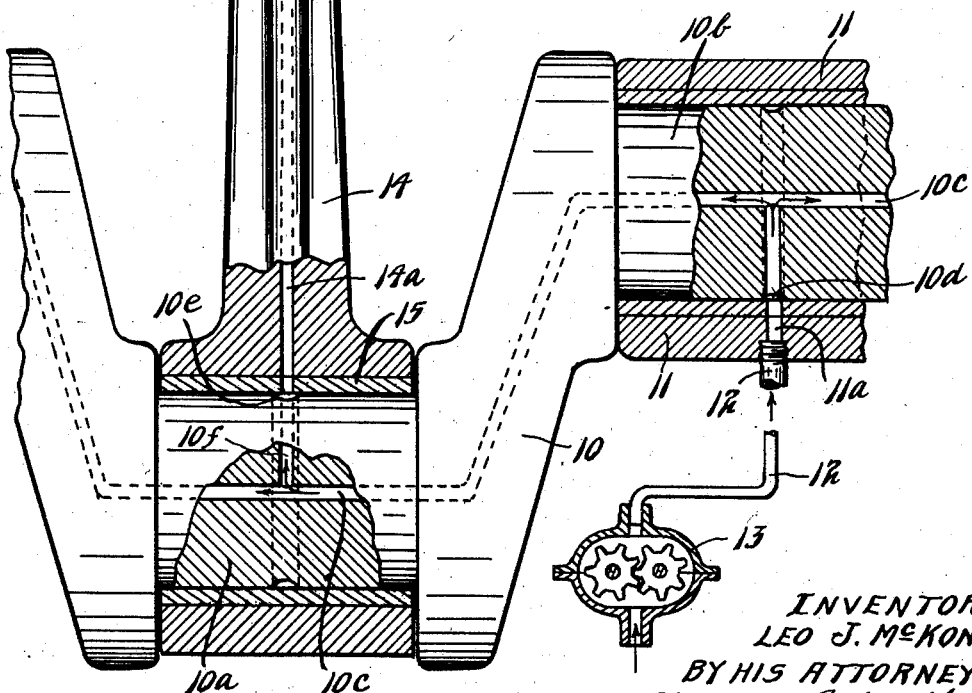
INVENTOR
LEO J. McKONE.
BY HIS ATTORNEYS.

May 23, 1933.        L. J. McKONE            1,910,902
PISTON LUBRICATING STRUCTURE
Filed Nov. 15, 1928        2 Sheets-Sheet 2

INVENTOR.
LEO J. McKONE.
BY HIS ATTORNEYS.

Patented May 23, 1933

1,910,902

UNITED STATES PATENT OFFICE

LEO J. McKONE, OF MINNEAPOLIS, MINNESOTA

PISTON LUBRICATING STRUCTURE

Application filed November 15, 1928. Serial No. 319,463.

This invention relates to an internal combustion engine, and while the invention is applicable to any type of internal combustion engine and in fact is applicable to all engines having a reciprocating piston, it particularly is designed for the modern high speed automobile or aeroplane engine. The tendency in the designing of such engines today is to have smaller cylinders and pistons and higher speeds. With these high speeds, a serious lubricating problem has arisen. It is desirable to have a thin film of oil between the piston and the cylinder wall in order to prevent scoring or scuffing. Heretofore the piston and the cylinder wall have been lubricated by splashing of the oil from the crank case. It often happens that when the engine first starts there is not sufficient oil about the piston and the cylinder is scored or scuffed before the piston becomes well oiled and the same thing frequently happens when the parts become heated after a long run.

It is an object of this invention to provide a piston and cylinder structure in which the surfaces of the cylinder and piston are supplied with oil under pressure.

It is a further object of the invention to provide a cylinder and piston structure for an internal combustion engine in which the cylinder wall and piston are lubricated by forced lubrication or oil under pressure and at the same time the oil is kept from getting above the piston.

It is more specifically an object of this invention to provide a cylinder and piston structure for an internal combustion engine in which oil is forced through the crank shaft and connecting rod to a hollow wrist pin and from the wrist pin through openings in the piston to the piston and cylinder wall, the piston also preferably being provided with means for returning the oil to the crank case.

These and other objects and advantages of the invention will be fully set forth in the following description made in connection with the accompanying drawings, in which like reference characters refer to similar parts throughout the several views, and in which:—

Fig. 1 is for the most part a vertical section through the piston and connecting rod, a portion of the cylinder wall being shown and portions of the connecting rod and crank shaft being shown in side elevation;

Fig. 2 is a horizontal section taken on line 2—2 of Fig. 1 as indicated by the arrows;

Fig. 3 is a partial view similar to Fig. 1, showing a modification, and

Figure 4:
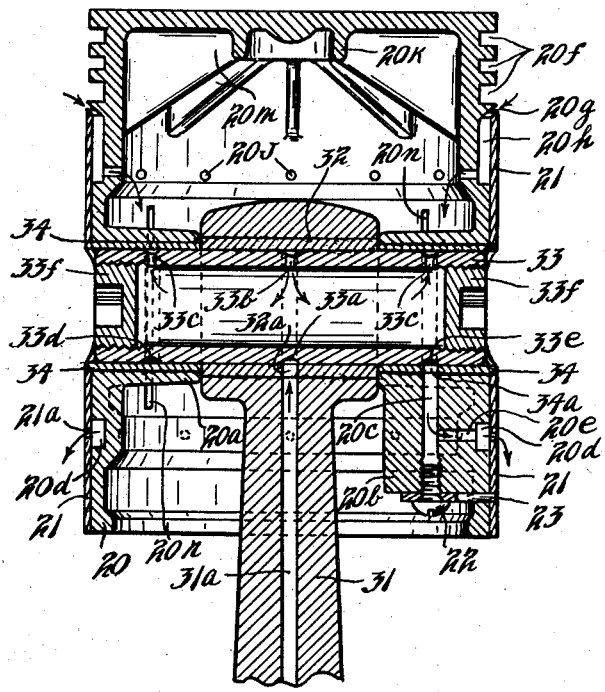
Fig. 4 is a partial view similar to Fig. 1, showing a further modification.
Figure 5:
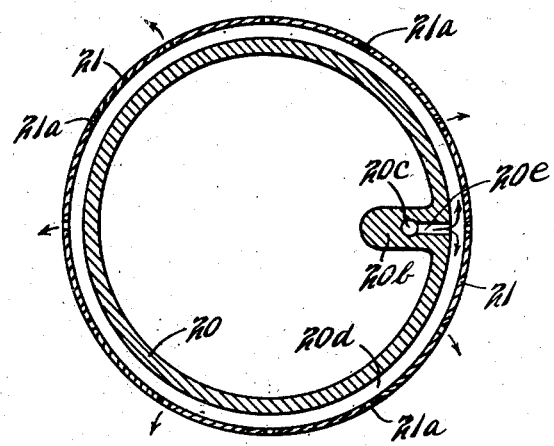

Referring to the drawings, particularly Fig. 1 and Fig. 2, a crank shaft 10 is shown of a common type for an internal combustion engine having the crank bearing portions 10a and 10b. The bearing portions 10b are journaled in the stationary bearings 11 of the engine and the bearing 11 shown is provided with an oil receiving passage 11a which will be connected by the conduit 12 to the usual oil circulating pump 13 of the engine. The crank shaft 10 has an oil passage 10c extending therethrough which communicates with a circumferential groove 10d in the crank portion 10b, oil being supplied to the groove 10d through the passage 11a by the pump 13, which oil is thus forced into the passage 10c. A connecting rod is shown containing the bushing 15 journaled on the crank shaft portion 10a, which connecting rod carries the usual hub at its other end which receives the wrist pin 17. The connecting rod 14 is provided with a longitudinally extending passage 14a which also extends through the bushing 15 and communicates with a circumferential groove 10e in the crankshaft portion 10a. Groove 10e is supplied with oil through the lateral passage 10f in the crank shaft so that passage 14a is thus in communication with the passage 10c. The connecting rod 14 at its upper end comprises the cap portion 14b secured to the rod by the headed and nutted bolts 16, shown in the dotted lines in Fig 1. This clamps the connecting rod firmly to the wrist pin 17 so that the wrist pin is fixed relatively to the connecting rod. As is now generally customary, a hollow wrist pin is used and said wrist pin is shown as having a lateral opening 17a communicating with passage 14a. The ends of the wrist pin are closed by plugs 18 which may be secured in any suitable manner, such as by the threads shown, said plugs being illustrated as having sockets 18a at their outer ends angular in cross section and adapted to receive a removing implement. The ends of wrist pin 17 are shown as journaled in bushings 19 secured in the hubs 20a of the piston 20. The wrist pin 17 has passages 17b at each end extending therethrough, the one of which at the left hand end of the pin as shown in Fig. 1 communicates with an oiling groove 17c. The opening 17b communicates with a larger circumferential groove 17d, and bushing 19 at the right hand end has a hole 19a therethrough in line with groove 17d. The piston hub 20a at the right has a boss 20b thereon extending downwardly in which is formed a passage 20c in line with the hole 19a. The piston 20 has a thickened circumferential portion some distance above the bottom and a circumferential slot 20d is formed in the outer wall of the piston in line with this enlargement. This slot 20d communicates with the opening 20c through a lateral passage 20e. The piston casting 20 will preferably be made of aluminum and the same is illustrated as provided with a thin cast-iron sleeve 21 which is forced over the casting 20. The aluminum or metal at the bottom of the piston is spun over the lower end of the sleeve 21. The bottom of passage 20c is plugged by a headed screw 22 which also passes through and secures a key 23 which projects laterally through piston 20 and sleeve 21 thus further insuring that sleeve 21 will be held properly in place. The sleeve 21 has a plurality of circumferentially spaced holes 21a extending therethrough disposed substantially centrally of the slot 20d. The piston 20 is at its upper end provided with the usual ring grooves 20f, three of these grooves being shown and the piston is provided with a downwardly and inwardly extending beveled surface 20g immediately below the lower groove 20f. The sleeve 21 terminates substantially at the lower part of this beveled surface 20g and is also formed with an inwardly and downwardly extending beveled edge. The piston 20 is of reduced diameter within the upper end of sleeve 21 thus forming a circumferential chamber 20h and said piston is provided with a plurality of circumferentially spaced small holes 20j extending radially therethrough substantially at the bottom of the chamber 20h. As shown in Fig. 1, the piston 20 has a central downwardly extending annular rib 20k at its top interior portion from which radiate a plurality of downwardly extending ribs 20m extending to the piston wall. The piston 20 is provided on its interior with a plurality of vertically extending slots 20n. A portion of the cylinder wall 24 is shown and the rings at the upper end of the piston are indicated as 25.

In operation the crank shaft will be driven as usual by the explosions in the cylinder above the piston and by the resulting reciprocation of the piston. After the motor is running, oil is forced through the crank shaft 10 by the oil pump 13, said oil passing through passages 10c and 14a into the wrist pin 17 which will be substantially filled with oil. This oil is forced out under pressure through the opening 17b and the same will pass through opening 19a into passage 20c and through passage 20e into the circumferential slot or chamber 20d. This oil will be under twenty-five pounds or more pressure and will be forced out through the openings 21a thus coming into engagement with the exterior periphery of the piston and with the cylinder wall. The cylinder wall is thus lubricated by forced lubrication and will not have to depend on the splash lubrication from the oil in the crank case. It is undesirable to have the oil pass above the piston and this will be prevented by the lower ring 25 which will fit the cylinder wall very tightly. As the piston reciprocates the lower edge of this ring will sweep the oil downwardly and this oil will pass through the slot between the upper end of the sleeve 21 and the beveled surface 20g. As the piston rises in the cylinder the oil will be moved into this opening, the oil thus passes into chamber 20h and can pass through openings 20j to the interior of the piston and be returned to the crank case. With the present structure, therefore, not only is oil delivered under pressure to the piston and cylinder walls thus insuring the desired lubrication, but any excess oil is taken care of and returned to the crank case so that there will not be an excessive amount of oil in the cylinder which might get above the pistons into the explosion chamber. With the described construction the parts will be effectively lubricated and the lubrication will start substantially with the starting of the engine. A good fit can thus be made between the skirt of the piston and the cylinder with no danger of scoring or scuffing the cylinder and any piston "slap" will be eliminated.

In the modification shown in Fig. 3 the parts are the same as already described, except that the connecting rod 26 carries a bushing 27 in its upper end which is journaled on the wrist pin 28. The wrist pin is of the usual hollow construction already described and is provided with closing plugs 29 similar to plugs 18 already described. The rod 26 has a longitudinal passage 26a therethrough communicating with the hole 27a in bushing 27. The wrist pin 28 has a circumferential groove 28a in its outer surface aligned with the hole 27a, which groove communicates with the hole or passage 28c within the interior of pin 28. The pin 28 is held stationary in the piston hubs 20a by a dowel screw 30 threaded in one of said hubs and having a tapered end engaging a hole in the pin 28. Pin 28 has a hole 28b extending therethrough communicating with the passage 20c in the piston 20, the piston being exactly the same as already described and having the outer sleeve 21 thereon.

In the operation of the device shown in Fig. 3, the oil will be forced through passage 26a and the hole 27a into the groove 28a and thence through the hole 28c into the pin 28. The oil will then be forced through passage 20c and passage 20e into the slot or chamber 20d and out through the holes 21a already described to the exterior piston surfaces and the surface of the cylinder wall. The oil will be moved by the lower ring 25 and will, as already described, pass into the chamber 20h at the upper part of the piston and return to the crank case through the holes 20j.

In Fig. 4 the piston is shown having the full floating type of wrist pin. This structure comprises a connecting rod 31 having the longitudinal passage 31a therein which aligns with the hole 32a in the bushing 32 in the upper part of the connecting rod. The hole 32a aligns with the circumferential groove 33a on the exterior of the wrist pin 33, which pin has a hole 33b therethrough aligned with the groove 33a. The pin 33 is closed at its ends by the plugs 33f similar to the plugs 18 already described. Pin 33 also has a pair of holes 33c extending therethrough adjacent each end at its top, the one at the left hand end communicating with an oil groove 33d and the one at the right communicating with a larger circumferential groove 33e, which latter groove aligns with a hole 34a extending through a bushing 34 in the piston hub 20a of the piston 20. Both piston hubs 20a are provided with a bushing 34. Passage 34a communicates with a passage 20c in the piston already described. The other parts shown in Fig. 4 are as already described in connection with Fig. 1.

In operation of the structure shown in Fig. 4, the oil will be forced through the passage 31a and hole 32a into the groove 33a and thence to the opening 33b into the wrist pin. The oil will pass out through the openings 33c and same will thus be supplied to groove 33e from which it will pass through hole 34a and through passages 20c and 20e to the chamber 20d. The oil will pass from chamber 20d as already described, through holes 21a to the piston and cylinder wall. In the structure shown in Fig. 4 the pin 33 is journaled in both the bushing 32 as well as the bushing 34 and is held from lengthwise movement only by the cylinder wall.

From the above description it is seen that applicant has provided a very efficient lubricating structure. The piston used can be made of aluminum and the lightness and conductivity of this metal are thus secured, while the cast-iron sleeve 21 will give long wear. The slots 20n are provided in the piston to take care of the expansion so that too great strain will not be placed on the sleeve 21. The plugs in the end of the wrist pin can be made of aluminum or brass as desired. With the described structure effective lubrication is secured with no objectionable surplus of oil and dry spots on the piston and cylinder wall, as well as other objectionable action on the cylinder wall are eliminated. The structure has been amply demonstrated in actual practice by a long test in an automobile and found to be very successful. With the present structure the engine runs in a very quiet manner. As set forth in the description of the various modifications, the structure is applicable to all types of wrist pins. A simple wrist pin can be used and one which can be quickly made in quantity production.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. An internal combustion engine structure having in combination, a piston comprising a core forming the top of said piston and having a wrist pin bore intermediate its ends, a hollow wrist pin insertable laterally in said bore, means closing the ends of said wrist pin, said core having a skirt portion below said wrist pin with a circumferential groove extending about its periphery, a passage affording communication between said groove and the interior of said wrist pin, a shell tightly fitting said core above and below said wrist pin bore and forming with said groove an annular chamber, said shell having a plurality of small holes therethrough in alinement with said chamber, and means for forcing oil into said wrist pin through said passage and into said chamber, whereby it can pass through said holes to the cylinder wall.

2. An internal combustion engine structure having in combination, a piston comprising a central core forming the top of said piston having a wrist pin bore intermediate its ends, a hollow wrist pin in said bore, said core having ring grooves at the upper end of said core, said core being beveled inwardly and downwardly to a portion of small diameter immediately below the lower one of said ring grooves, a thin shell tightly fitting said core above and below said wrist pin bore and forming an annular chamber with said portion of reduced diameter, the upper end of said shell having an outwardly and upwardly beveled edge to form with said beveled portion of said core an annular passage, said core having a plurality of holes therethrough adjacent the bottom of said chamber, whereby oil can pass through said passage into said chamber and to the interior of said passage for oiling said wrist pin, means closing the ends of said wrist pin, means for forcing oil into said wrist pin, and means for delivering oil under pressure from said wrist pin to the skirt portion of said piston at the cylinder wall.

3. An internal combustion engine structure having in combination, a piston comprising a central core having a wrist pin bore intermediate its ends, said core having ring grooves at its upper end, a hollow wrist pin in said bore, a shell tightly fitting said core above and below said wrist pin bore, means closing the ends of said wrist pin, means for delivering oil under pressure to the interior of said wrist pin, and means for delivering oil under pressure from said wrist pin to circumferentially spaced points about said piston and through said shell below said wrist pin bore.

4. An internal combustion engine structure having in combination, a piston comprising a central core having wrist pin bosses therein intermediate its ends, said bosses having a bore therein, a wrist pin in said bore, means closing the ends of said wrist pin, a thin shell of different metal than said core surrounding said core and tightly fitting the same above and below said wrist pin, said core having a circumferential groove thereabout below said wrist pin, said shell having a series of openings therethrough alining with said groove, means for delivering oil under pressure to the interior of said wrist pin, an opening through said wrist pin, a groove about said wrist pin alined with said opening, and a passage leading from said groove to said first mentioned groove whereby oil under pressure is delivered through said shell to the exterior of the skirt of said piston.

In testimony whereof I affix my signature.
LEO. J. McKONE.